United States Patent [19]
Lymberis et al.

[11] Patent Number: 5,546,697
[45] Date of Patent: Aug. 20, 1996

[54] FLORAL WATER TUBE FOR MOUNTING A FLOWER AT A SELECTED ELEVATION

[76] Inventors: Vlasios Lymberis, 30 Fawn Hill Rd., Monsey, N.Y. 10952; Dimitrios Lymberis, 166 78th St., Brooklyn, N.Y. 11209

[21] Appl. No.: 423,025

[22] Filed: Apr. 17, 1995

[51] Int. Cl.⁶ .............................. A01G 5/00; A47G 7/00
[52] U.S. Cl. ................................. 47/41.15; 47/55
[58] Field of Search ................... 47/41.01, 55, 41.15, 47/41.12

[56]  References Cited

U.S. PATENT DOCUMENTS

| | | | |
|---|---|---|---|
| 131,141 | 9/1972 | Will | 47/41.01 |
| 1,162,176 | 11/1915 | Lewis | 47/41.01 |
| 1,448,808 | 3/1923 | McGowan | |
| 2,218,157 | 10/1940 | Seidel | 47/41.15 |
| 2,908,112 | 10/1959 | Koistinen | |
| 3,150,462 | 9/1964 | Gallo | 47/55 |
| 3,177,617 | 4/1965 | Koistinen | |
| 3,290,819 | 12/1966 | Turner | |
| 3,321,866 | 5/1967 | Gallo | 47/55 |
| 3,452,476 | 7/1969 | Kise | 47/55 |
| 3,928,936 | 12/1975 | Wollen | |

FOREIGN PATENT DOCUMENTS 2225080  11/1974  France ................................ 47/55

*Primary Examiner*—Terry Lee Melius
*Assistant Examiner*—Joanne C. Downs
*Attorney, Agent, or Firm*—Samuelson & Jacob

[57]  ABSTRACT

A floral water tube has a piercing projection for mounting the floral water tube on a retaining base, the piercing projection having a socket extending along the piercing projection and an extension post selectively coupled to the socket along the piercing projection for mounting the floral water tube at selected elevations relative to the retaining base, the selected elevations corresponding to the axial length of the coupled extension post.

7 Claims, 2 Drawing Sheets

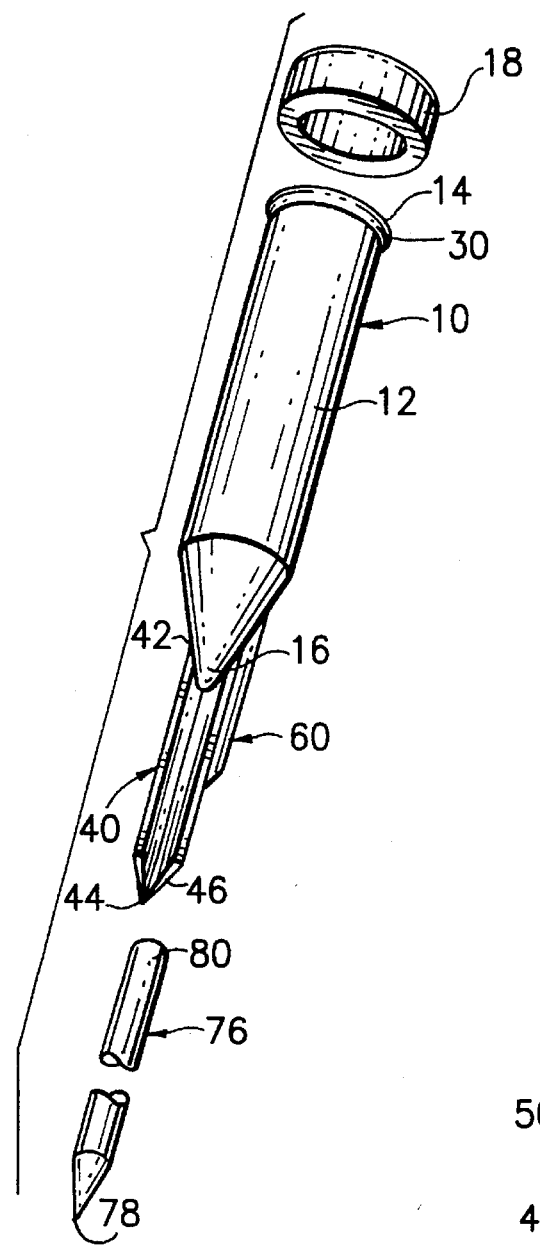
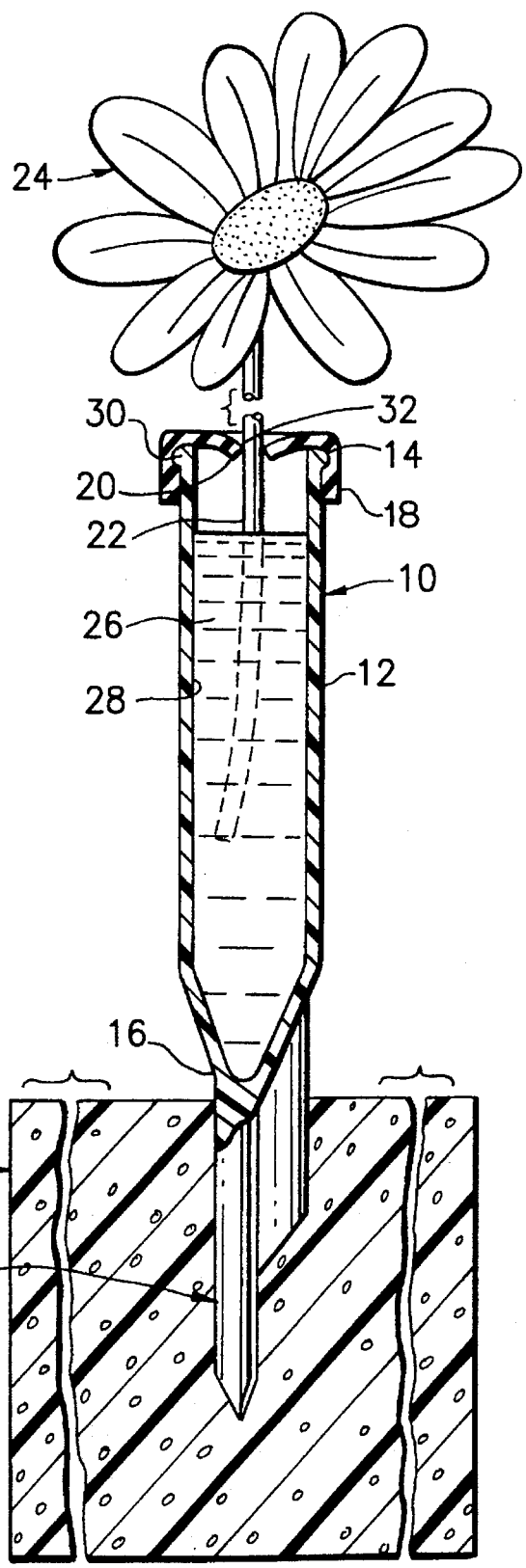
FIG. 1
FIG. 2

FLORAL WATER TUBE FOR MOUNTING A FLOWER AT A SELECTED ELEVATION

The present invention relates generally to floral water tubes and pertains, more specifically, to a floral water tube having a construction which enables the selection of the elevation at which the flower held in the water tube is mounted above a retaining base to which the water tube is secured.

Floral water tubes have been in use for a very long time for mounting flowers in a floral arrangement where the flower stems are to be irrigated to maintain the arrangement fresh and attractive for longer periods of time. Usually, the stem of each flower is secured within the floral water tube and immersed within water held in a reservoir in the floral water tube. The floral water tube is provided with an integral, pointed projection for piercing the material of a retaining base to secure the floral water tube, with the flower therein, to the retaining base. A plurality of flowers in a corresponding plurality of water tubes thus make up an attractive and longer-lasting floral arrangement.

In order to place the flowers of the arrangement at selected various elevations, for an aesthetically pleasing floral arrangement, different types of floral water tubes have been made available. In one currently available floral water tube, the pointed projection, or spike, of the floral water tube is unitary with the tubular reservoir of the floral water tube, enabling securement of the floral water tube to the retaining base at an essentially fixed elevation, determined by the length of the spike. In another currently available floral water tube, the spike is detachable and is selectively coupled to the tubular reservoir of the floral water tube so that the elevation of the floral water tube can be varied by selecting a spike of desired length. Usually, a florist will maintain an inventory of both of the above types of floral water tubes so that each may be employed where appropriate to the arrangement being created.

The present invention provides a single floral water tube having both a unitary piercing projection for use where such a unitary device is most appropriate, and an attachable extension piercing projection for selective use where it is desired to vary the elevation of the mounted floral water tube and the flower therein. As such, the present invention attains several objects and advantages, some of which are summarized as follows: Provides increased flexibility of use in that a single floral water tube is available for multiple uses in creating floral arrangements; simplifies the creation of a wider variety of aesthetically pleasing floral arrangements with fewer component parts; allows an arranger of flowers to select the particular elevation desired for any flower in a floral arrangement, from a variety of elevations, during the creation of the arrangement, without removing the flower from the floral water tube and relocating the flower in an alternate floral water tube, thus reducing wear and tear on the flower while promoting a wider variety of aesthetically pleasing floral arrangements; enables the reduction of inventory of floral water tubes in that one configuration replaces the formerly required multiple configurations necessary for creating various floral arrangements; reduces expense in both manufacturing and in purchases for inventory by reducing the variety of component parts which must be on hand to attain the desired variations in floral arrangements; enables the economical manufacture and sale of floral water tubes of consistent high quality for increased flexibility of use at lower cost to both the manufacturer and the user.

The above objects and advantages, as well as further objects and advantages, are attained by the present invention which may be described briefly as an improvement in a floral water tube having a tubular reservoir within which the stem of a flower is held for irrigation, and a piercing projection extending from the tubular reservoir for mounting the tubular reservoir, with the flower, upon a retaining base constructed of a material capable of receiving the piercing projection to secure the floral water tube to the retaining base, the piercing projection extending axially from a near end of the piercing projection integral with the tubular reservoir to a far end of the piercing projection remote from the tubular reservoir and including a piercing configuration at the far end, the improvement enabling selection of the elevation of the tubular reservoir above the retaining base when the floral water tube is secured to the retaining base, the improvement comprising: a first coupling element extending axially along the piercing projection between the far end and the near end, the first coupling element being spaced axially away from the piercing configuration at the far end toward the near end of the piercing projection; an extension post having a first end, a second end, and a selected axial length between the first end and the second end; a second coupling element at the second end of the extension post, the second coupling element being complementary to the first coupling element for selectively coupling the extension post to the piercing projection; and a further piercing configuration at the first end of the extension post, the axial length of the extension post being such that upon selective coupling of the extension post with the tubular reservoir, the further piercing configuration is placed axially further from the tubular reservoir than the piercing projection to selectively elevate the tubular reservoir further from the retaining base by a distance corresponding to the axial length of the extension post.

The present invention will be understood more fully, while still further objects and advantages will become apparent, in the following detailed description of a preferred embodiment of the invention illustrated in the accompanying drawing, in which:

FIG. 1 is an exploded perspective view of a floral water tube constructed in accordance with the present invention;

FIG. 2 is a side elevational view of the floral water tube, partially sectioned to show internal features, and in use in securing a flower to a retainer base;

Figure 3:
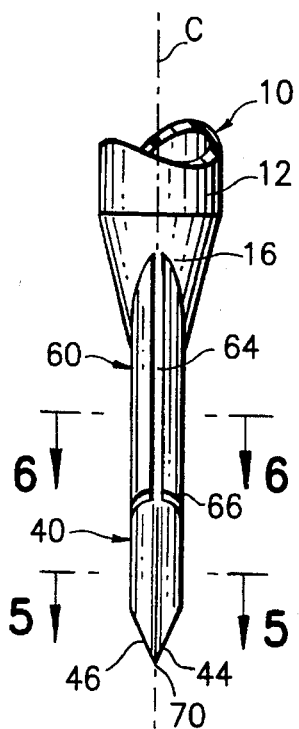
FIG. 3 is a fragmentary front elevational view of the floral water tube.
Figure 4:
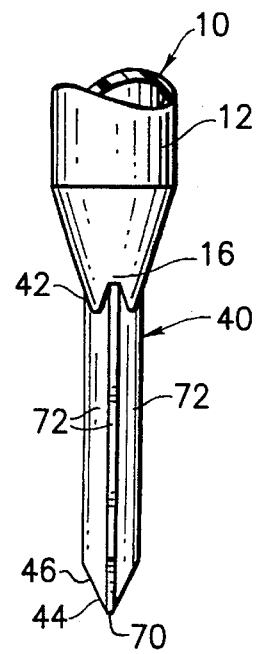
FIG. 4 is a fragmentary rear elevational view.
Figure 5:
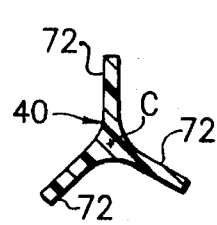
FIG. 5 is an enlarged cross-sectional view taken along line 5—5 of FIG. 3.

Referring now to the drawing, and especially to FIGS. 1 and 2 thereof, a floral water tube constructed in accordance with the present invention is shown generally at 10 and is seen to include a tubular reservoir 12 having a first end in the form of an upper end 14 and a second end in the form of a lower end 16. A cap 18 is fitted onto the upper end 14 and has an aperture 20 for the reception of the stem 22 of a flower 24, with the stem 22 extending into water 26 retained within a chamber 28 in the tubular reservoir 12. Preferably, the cap 18 is constructed of a resilient material, such as an elastomer, so that the cap 18 is dilated over a bead 30 at the upper end 14 of the tubular reservoir 12 to grip the upper end 14, and the rim 32 of the aperture 20 grips the stem 22 to hold the flower 24 in place for irrigation by the water 26.

A piercing projection is shown in the form of a spike 40 extending axially downwardly from the lower end 16 of the tubular reservoir 12, from a near end 42 of the spike 40 to a far end 44 of the spike 40. In the preferred construction, floral water tube 10 is molded of a relatively rigid synthetic polymeric material, such as polyethylene, in a unitary structure which includes the tubular reservoir 12 and the spike 40. Spike 40 has a piercing configuration in the form of a pointed shape 46 at the far end 44, enabling the spike 40 to be pushed into a retaining base 50, as shown in FIG. 2, to secure the floral water tube 10, with the flower 24 in a selected location relative to the retaining base 50. The retaining base 50 is constructed of a material easily pierced by the spike 40, such as a foamed polyurethane or polystyrene which, though easily pierced, possesses sufficient rigidity to support the floral water tube 10, with the flower 24 therein, at the selected location. At that selected location, the spike 40 is driven fully into the retaining base 50 so that the floral water tube 10, and the flower 24 therein, are placed securely at a given elevation.

Turning now to FIGS. 3 through 6, spike 40 includes a first selective coupling element, shown in the form of a socket 60 having a generally tubular wall 62 which is split by a slot 64 passing laterally, or radially through the tubular wall 62 and extending longitudinally, or axially along the socket 60. The socket 60 extends axially downwardly from the lower end 16 of the tubular reservoir 12 and terminates at a terminal end 66 spaced longitudinally, or axially upwardly away from the far end 44 of the spike 40. The terminal end 66 of the socket 60 is tapered toward the pointed shape 46 of the spike 40 so that as the spike 40 is driven into the retaining base 50, the tapered terminal end 66 and the slot 64 of the socket 60 ease the passage of the socket 60 into the material of the retaining base 50 and facilitate securement of the floral water tube 10 in place in the retaining base 50. The pointed shape 46 terminates in a point 70 which lies on central axis C of the tubular reservoir 12, for easing penetration of the material of the retaining base 50.

The spike 40 is provided with three axially extending ribs 72 spaced circumferentially from one another equidistantly to form a generally Y-shaped cross-sectional configuration between the far end 44 of the spike 40 and the terminal end 66 of the socket. The ribs 72 provide the spike 40 with sufficient rigidity to pierce the material of the retaining base 50, while easing any resistance toward penetration. Each rib 72 is tapered at the pointed shape 46 and terminates at point 70. In addition, the multiple-ribbed configuration of spike 40 secures the spike 40 against rotation about central axis C when the spike 40 is embedded in the retaining base 50, thereby further maintaining accuracy in placement of the flower 24 in an arrangement.

Figure 7:
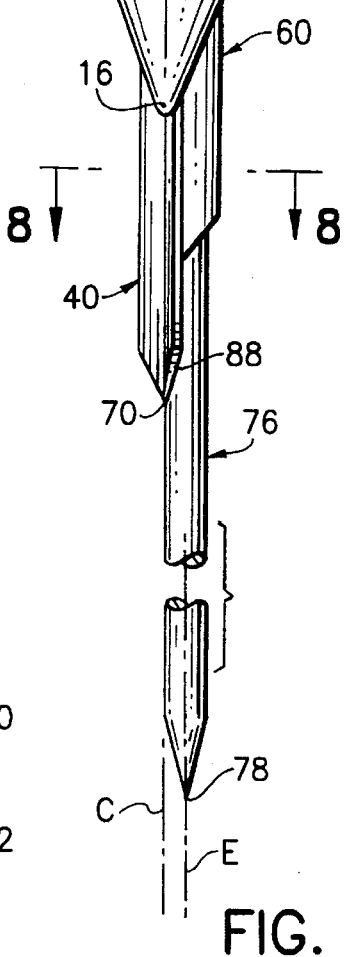
FIG. 7 is a fragmentary side elevational view showing an extension post coupled in the floral water tube.
Figure 6:
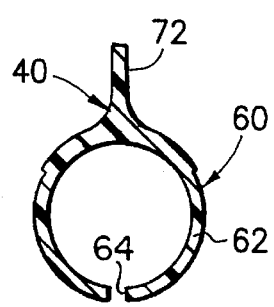
FIG. 6 is an enlarged cross-sectional view taken along line 6—6 of FIG. 3.
Figure 8:
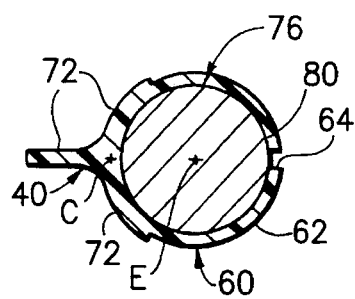
FIG. 8 is an enlarged cross-sectional view taken along line 8—8 of FIG. 7.

When it is desired, for aesthetic purposes in the creation of a floral arrangement, to secure the tubular reservoir 12, and the flower 24 retained therein, to the retaining base 50 in a position elevated with respect to the position illustrated in FIG. 2, an extension post 76 is coupled to the tubular reservoir 12, as shown in FIGS. 7 and 8. Extension post 76 includes a further piercing configuration, in the form of a pointed end 78, at a first end of the extension post 76, and a second coupling element, shown in the form of a plug 80, at a second end of the extension post 76. The extension post 76 selectively is coupled to the tubular reservoir 12 by inserting the plug 80 into the socket 60, the slot 64 of the socket 60 enabling resilient dilation of the socket 60 for easing the insertion. Once the extension post 76 is securely coupled with the tubular reservoir 12, the assembled floral water tube 10 is secured to the retaining base 50 by penetration of the pointed end 78 of the extension post 76 into the material of the retaining base 50. The elevation of the tubular reservoir 12 above the retaining base 50 is governed by the longitudinal, or axial length of the extension post 76 between the first and second ends of the extension post 76. Thus, various elevations can be selected merely by selecting an extension post 76 of corresponding length. The ability to select an extension post 76 of any desired length, or to elect not to use an extension post 76 at all, while the flower 24 is retained within the tubular reservoir 12, provides the floral arranger with great flexibility in locating each particular flower in an arrangement, without the necessity for removing the flower 24 from the tubular reservoir 12 and placing the flower 24 in another floral water tube during the creation of a floral arrangement. In this manner, increased flexibility is attained without undue wear and tear on the flowers of an arrangement.

In order to maintain stability and accuracy in the placement of the floral water tube 10 during the creation of a floral arrangement, the central axis E of the extension post 76 is placed parallel to and in close proximity with the central axis C of the tubular reservoir 12. To that end, the Y-shaped configuration of the spike 40 is continued along the socket 60 such that the tubular wall 62 at either side of the slot 64 essentially is a circumferential extension of the corresponding ribs 72 of the spike 40, so that the extension post 76 is nested between the corresponding ribs 72 of the spike 40, and the central axis E of the extension post 76 is placed in close lateral proximity to the central axis C of the tubular reservoir 12. The tapered configuration of the ribs 72 at the point 70 assures that the spike 40 is faired smoothly into the extension post 76 at the transition location 88.

It will be seen that the present invention attains all of the objects and advantages summarized above, namely: Provides increased flexibility of use in that a single floral water tube is available for multiple uses in creating floral arrangements; simplifies the creation of a wider variety of aesthetically pleasing floral arrangements with fewer component parts; allows an arranger of flowers to select the particular elevation desired for any flower in a floral arrangement, from a variety of elevations, during the creation of the arrangement, without removing the flower from the floral water tube and relocating the flower in an alternate floral water tube, thus reducing wear and tear on the flower while promoting a wider variety of aesthetically pleasing floral arrangements; enables the reduction of inventory of floral water tubes in that one configuration replaces the formerly required multiple configurations necessary for creating various floral arrangements; reduces expense in both manufacturing and in purchases for inventory by reducing the variety of component parts which must be on hand to attain the desired variations in floral arrangements; enables the economical manufacture and sale of floral water tubes of consistent high quality for increased flexibility of use at lower cost to both the manufacturer and the user.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An improvement in a floral water tube having a tubular reservoir within which the stem of a flower is held for irrigation, and a piercing projection extending from the tubular reservoir for mounting the tubular reservoir, with the flower, upon a retaining base constructed of a material capable of receiving the piercing projection to secure the floral water tube to the retaining base, the piercing projection extending longitudinally from a first end to a second end, the first end of the piercing projection being integral with the tubular reservoir and the second end of the piercing projection being remote from the tubular reservoir and including a piercing configuration at the second end, the improvement enabling selection of the elevation of the tubular reservoir above the retaining base when the floral water tube is secured to the retaining base, the improvement comprising:

a first selective coupling element extending longitudinally along the piercing projection between the first end and the second end, the first selective coupling element being spaced longitudinally a distance from the piercing configuration at the second end of the piercing projection and in a direction toward the first end of the piercing projection;

an extension post for selective coupling to the piercing projection, the extension post having a first end, a second end, and a selected longitudinal length between the first end and the second end of the extension post;

a second selective coupling element at the second end of the extension post, the second selective coupling element being complementary to the first selective coupling element for selectively coupling the extension post to the piercing projection; and a further piercing configuration at the first end of the extension post, the longitudinal length of the extension post being such that upon selective coupling of the extension post with the tubular reservoir, the further piercing configuration is placed longitudinally further from the tubular reservoir than the piercing projection to selectively elevate the tubular reservoir further from the retaining base by a distance corresponding to the longitudinal length of the extension post.

2. An improvement in a floral water tube having a tubular reservoir within which the stem of a flower is held for irrigation, and a piercing projection extending from the tubular reservoir for mounting the tubular reservoir, with the flower, upon a retaining base constructed of a material capable of receiving the piercing projection to secure the floral water tube to the retaining base, the piercing projection extending longitudinally from a first end to a second end, the first end of the piercing projection being integral with the tubular reservoir and the second end of the piercing projection being remote from the tubular reservoir and including a piercing configuration at the second end, the improvement enabling selection of the elevation of the tubular reservoir above the retaining base when the floral water tube is secured to the retaining base, the improvement comprising:

a first coupling element extending longitudinally along the piercing projection between the first end and the second end, the first coupling element being spaced longitudinally a distance from the piercing configuration at the second end of the piercing projection and in a direction toward the first end of the piercing projection;

an extension post for selective coupling to the piercing projection, the extension post having a first end, a second end, and a selected longitudinal length between the first end and the second end of the extension post;

a second coupling element at the second end of the extension post, the second coupling element being complementary to the first coupling element for selectively coupling the extension post to the piercing projection; and a further piercing configuration at the first end of the extension post, the longitudinal length of the extension post being such that upon selective coupling of the extension post with the tubular reservoir, the further piercing configuration is placed longitudinally further from the tubular reservoir than the piercing projection to selectively elevate the tubular reservoir further from the retaining base by a distance corresponding to the longitudinal length of the extension post;

the first coupling element being a socket extending longitudinally along the piercing projection, and the second coupling element being a plug extending along the extension post, the plug being complementary to the socket.

3. The invention of claim 2 wherein the piercing configuration includes a pointed shape at the second end of the piercing projection, the pointed shape being spaced longitudinally from the socket.

4. The invention of claim 3 wherein the socket includes a generally tubular wall and a slot passing laterally through the tubular wall and extending longitudinally toward the pointed shape.

5. The invention of claim 3 wherein the socket includes a generally tubular wall having a terminal end spaced longitudinally from the second end of the piercing projection, the tubular wall of the socket being tapered toward the pointed shape.

6. The invention of claim 3 wherein the piercing projection has a generally Y-shaped lateral cross-sectional configuration between the second end and the socket.

7. The invention of claim 6 wherein the tubular reservoir has a first longitudinally-extending central axis and the socket has a second longitudinally-extending central axis, and the generally Y-shaped cross-sectional configuration is continued along the socket to bring the first and second longitudinally-extending central axes into close lateral proximity with one another.

* * * * *